United States Patent [19]

Schneider et al.

[11] 4,312,653
[45] Jan. 26, 1982

[54] PROCESS FOR THE PRODUCTION OF A COATED GLASS BODY

[75] Inventors: Hartmut Schneider; Alfred Papp, both of Munich, Fed. Rep. of Germany

[73] Assignee: Siemens Aktiengesellschaft, Berlin & Munich, Fed. Rep. of Germany

[21] Appl. No.: 119,017

[22] Filed: Feb. 6, 1980

[30] Foreign Application Priority Data

Feb. 28, 1979 [DE] Fed. Rep. of Germany ....... 2907833

[51] Int. Cl.³ .................... C03B 37/07; C03B 37/075; C03C 17/02
[52] U.S. Cl. ..................... 65/3.12; 65/60.8; 65/18.1; 427/163
[58] Field of Search ............ 65/3 A, 60 R, 3.12, 65/18.2; 427/163, 231

[56] References Cited

U.S. PATENT DOCUMENTS 3,574,033 4/1971 Kolkman et al. .............. 427/231 X
4,154,591 5/1979 French et al. ................. 65/3 A X

FOREIGN PATENT DOCUMENTS 2625010 12/1976 Fed. Rep. of Germany .
1501586 2/1978 United Kingdom .

OTHER PUBLICATIONS

Geittner et al., "Low-Loss Optical Fibers Prepared by Plasma-Activated CVD", *Applied Physics Letter,* vol. 28, No. 11, Jun. 1, 1976, pp. 645-646.

*Primary Examiner*—Richard V. Fisher
*Attorney, Agent, or Firm*—Hill, Van Santen, Steadman, Chiara & Simpson

[57] ABSTRACT

A process for the production of coated glass bodies in which a glass layer is provided by a cycle including applying a glass forming material on a surface of a rotating body and transforming the glass forming material into the glass layer by locally heating a zone of the body and moving the local heating zone along the surface of the rotating body characterized by changing either the direction of rotation or initial point of commencing the rotation or both during the commencement of each cycle so that the effect of anisotropy of the plurality of glass layers is largely eliminated.

5 Claims, 1 Drawing Figure

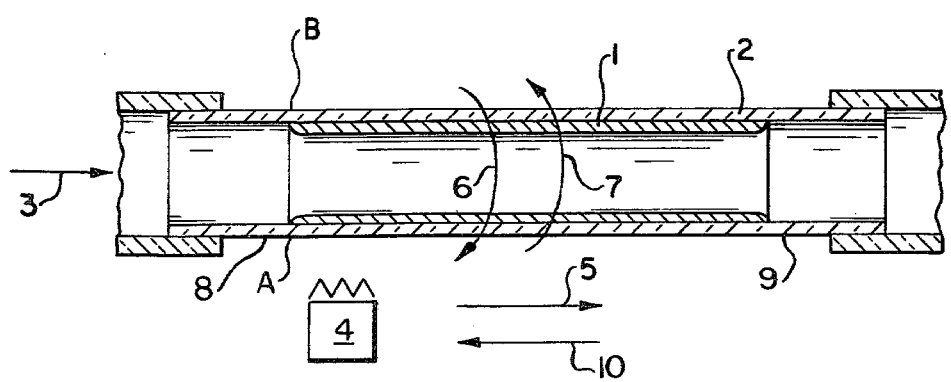

PROCESS FOR THE PRODUCTION OF A COATED GLASS BODY

BACKGROUND OF THE INVENTION

The present invention is directed to a process for a production of a coated glass body, in particular, for the production of glass fiber light waveguides or conductors. The process comprises forming glass layers on a surface of a rotating body in a cycle which includes applying a layer of a substance which either contains glass or is transformed into glass and subsequently transforming each applied layer of the substance into a glass layer by locally heating and moving the zone of local heating along the surface of the body in a given direction.

An example of a process of a type in which a glass forming substance or glass substance is deposited on a surface of a body and then transformed into a glass layer is a chemical vapor deposition (CVD) process. An example of such process is described in an article by P. Geittner et al, "Low-Loss Optical Fibers Prepared by Plasma-Activated Chemical Vapor Deposition (CVD)", *Applied Physics Letter, Vol.* 28, No. 11, June 1, 1976, pp. 645-6, and also in the articles mentioned in the footnotes 1-3 of this article. In a process of this type, the glass body consists of a glass tube whose inner wall surface is coated by conducting a flow of gas through the rotating tube and strongly heating a short portion of the tubes by means of a heating device so that a chemical reaction can take place which leads to a depositing of a glass forming substance out of the gas. The heating device is slowly moved in a longitudinal direction of the tube so that the heating zone in the tube slowly travels along the length of the tube.

A glass fiber formed from the internally coated tube of this type or kind is produced in a known manner in which the tube is deformed or collapsed into a rod. The rod is then heated at one end to the necessary temperature so that a fiber may be drawn from the heated end of the rod. The fiber formed by this process has a stepped index profile.

However, the fibers produced by this method have been proved to have the properties of being either depolarizing, birefringent, or optically active.

Practical applications for fibers frequently required fibers which are neither depolarizing, birefringent nor optically active. For example, monomode glass fibers, which can be produced by a process as described above, would be predominantly suitable for the transmission of short light pulses in communication technology if the propagation delays between the two orthogonally polarized states of the fundamental mode in the fiber did not occur and thus undesireable reductions in the information transmission were not present in the fiber. Many other applications of the fiber will require a predetermined polarization of the emerging light. This occurs in interferometric processes such as a fiber optical rotation measurement process and in magneto-optical processes such as a fiber optical current strength measurement process.

The origin of the undesired properties of the real glass fibers includes deviations of the fiber core from the cylindrical symmetry or the anisotropic property of the material. A process for increasing the cylindrical symmetry is disclosed in German O.S. 26 25 010 and consists that during the deformation of the glass tube such as collapsing or drawing the tube into a rod, an increased gas pressure is provided in the remaining part of the tube and is maintained. A fiber, which has been improved in this manner in respect to a cylindrical symmetry, does in fact exhibit a clear reduction in birefringence in comparison to a fiber of lesser symmetry, but a residual birefringence and an optical active property still remains. From this, the inventors of the present invention have deduced that the anisotropy still exists in the coating materials.

SUMMARY OF THE INVENTION

The present invention is directed to an improved process for creating glass layers on a surface or member in which the effect of anisotropy in the combined layers of the coating materials is largely eliminated.

The object of the present invention is accomplished by an improvement in a process for producing a coated glass body in particular for providing a body for use in the production of a glass fiber for a weight waveguide which process includes rotating a body and forming a plurality of glass layers on a surface of the rotating body with each glass layer being formed by a cycle including applying at least one substance containing a glass forming material on a surface of the rotating body and then locally transforming the glass forming material into a glass layer by heating a local zone of the surface of the body and moving the zone in a predetermined direction along the surface of the body. The improvement comprises selectively changing a selected one of the direction of rotation of the body relative to the direction of movement of moving the heating zone along the surface of body and the point of commencing the step of heating as the heating zone is moved along the body during each cycle from the point of commencing the previous cycle so that the effect of anisotropy of the combined layers of glass is largely eliminated.

The improvement of the present invention is based on the principal that in order to produce a finished glass layer which is subject to asymmetry, it is necessary to produce a glass layer which has an opposite asymmetry to that of the asymmetry of the preceding glass layer. Thus, the glass layers mutually compensate for each other.

It is expedient to change the direction of rotation each time a cycle of the process is terminated and before a new cycle of travel commences. Another possibility is that in each consecutive cycle the step of heating starts at a new point of commencing or starting point, which point is a rotary position relative to the preceding point of commencing or starting point for the preceding path of travel of the heating zone.

Preferably, these rotary positions for the point of commencing or starting points are rotated by 180° relative to the previous positions so that the starting point of travel of each heating zone is 180° opposite the preceding starting point.

In order to compensate the aforementioned asymmetry, it is frequently sufficient to maintain the direction of rotation constant and to merely change the rotary position of each of the points of commencing of the travel for each of the heating zones. In other instances, it is desireable to change both the direction of rotation for each cycle and also the point of commencing travel for the heating zone.

BRIEF DESCRIPTION OF THE DRAWINGS

The FIGURE is a diagrammatic illustration of the method of the present invention.

DESCRIPTION OF THE PREFERRED EMBODIMENTS

The principles of the present invention will be readily apparent from an explanation of the following three preferred exemplary embodiments of the process. In turn, these exemplary embodiments will illustrate the production of a coated tube, production of a coated rod, and the production of a rod by coating a dish.

EXAMPLE I

A quartz glass tube having a length of one meter, an outer diameter of 20 mm and inner diameter of 17 mm is clamped horizontally in clamping chucks of a glass turning lathe. One end of this tube is connected to a gas supply by a rotatable connection. Approximately 1100 Nml/min of pure oxygen is allowed to flow from this gas supply into the tube.

The tube is heated by two mobile gas burners, such as oxyhydrogen burners which are provided with nozzle heads of approximately 50×100 mm and which are arranged in a horizontal plane and offset by 180°. Thus the burners are directed toward the tube from both sides. The burners move at a speed of 15 cm/min along the tube between the clamping chucks and thus produce a local heating zone in which a maximum tube temperature of approximately 1900° K. prevail and which zone travels through a longitudinal region of the tube between the chucks in the longitudinal direction. At the end of one cycle of travel at one end of the region, the burners return to a starting position at the other end of the region without heating the tube. Prior to the next heating cycle, a change is made in respect to the direction of rotation of the tube which rotates at a rate of approximately one revolution per second. When the tube has reached a predetermined rotary position, the burners are again activated to commence heating. After completing one cycle, the heating commences with the tube occupying a rotary position, which is rotated 180° relative to the predetermined previous rotary position.

After a few preliminary heating cycles, 90 Nml/min of $SiCl_4$ and 9 Nml/min of $BCl_3$ gas are mixed with the oxygen flowing into the tube from the one end to form the glass layers which will become the cladding glass layer of the optical fiber. The core glass for the ultimately formed fiber is produced by restricting or interrupting the supply of $BCl_3$ and by reducing the amount of $SiCl_4$ to be one half. In the heating zone of the tube, which zone is produced by the burners, the chlorides are converted into initially powdery oxides, which are glass forming substances and are deposited on the inner wall or surface of the tube. These oxides are then melted by the advancing heating zone to form a clear glass layer having a thickness of several $\mu m$. The cladding glass for the fiber is formed by melting on approximately 50 layers of this kind of $SiO_2$-$B_2O_3$ glass and the core glass is formed from two layers of $SiO_2$ glass.

A finished tube, which was coated by this process, can then be deformed or collapsed into a rod by employing the deformation method described in German O.S. No. 26 25 010. From the rod formed by collapsing or deforming the tube, a fiber having a core diameter of 5 $\mu m$ and an overall diameter of 65 $\mu m$ can be drawn. This optical fiber will have an index of refraction difference $\Delta_n \approx 0.003$ and a core index of refraction of $n \approx 1.46$. From measurements determined from the remote field intensity, the fiber will possess monomode properties for light of a wavelength of 0.633 $\mu m$.

In order to carry out a polarization-optical investigation, a fiber portion having a length of 20 m was wound onto an angle coiled form, which possessed two winding planes which enclose the angles 90° and thus permit the compensation of the birefringence which takes place during winding as a result of curvature. The fiber wound in angled fashion was found to exhibit a phase shift of only 0.03°/m between the orthogonally polarized $HE_{11}$ mode states. Thus the fiber exhibits a very small birefringence which was independent of shape.

Before the other two examples are described, the considerations and facts which lead to the present invention which thus also apply to the following examples will be briefly discussed.

The polarization-optical investigation of a round fiber, which was produced simply by increasing the gas pressure during the deformation of the tube to form a rod, did show a clear reduction in the birefringence in comparison to the asymmetrical fiber although a residual birefringence and an optical activity remained. However, it was discovered that the observed phase shift was related to the rotation speed of the tube and to the speed of the advance of the heating zone. During a rotation the heating zone moves along a pitch which is determined by the ratio between the speed of advance and the rotation speed. In the fiber portion whose volume is equal to the volume of one pitch of the fiber blank, the phase shift frequently closely approximates 360°. Consequently it was conjectured that the birefringence is the outcome of the helical heating and deposition procedures.

Occasionally, the asymmetrical heating produces a core form which assumes a helical shape or screw shape. The pitch of the screw or helical shape corresponds to the ratio of the translation and rotation speed of the heating zone relative to the tube. If an internally coated tube is allowed to cool, the applied glass layer tends to form cracks due to its differing rate of thermal expansion. These cracks likewise extend as helical lines. Thus, it may be concluded that the production of the tube by this method leads to the formation of tension helix in the tube which can be considered to be the outcome of non-uniform doping.

In attempting to discover a remedy, the basic principal was discovered that the asymmetry of the individual layer may be compensated by an opposite asymmetry of the following layer or layers. This can be achieved by means of the procedures which include either changing the direction of rotation of the tube during formation of each succeeding layer or changing the initial rotary position for the starting point or point of commencing the travel for the heating zone in the following cycle, or changing both the direction of rotation and the rotary position for the starting point of the path of travel of the heating zone.

This principal is not restricted to just forming glass tubes but can be used advantageously generally where a glass layer is to be applied to a surface of a rotating glass body. Two practical cases are described in the following two examples.

EXAMPLE II

If glass layers are applied to the cylindrical surface of a rod, it is possible to produce an overall glass layer of arbitrary thickness. For this purpose, a quartz glass rod having a thickness of 10 mm is clamped in a glass turning lathe. Glass powder is deposited on the rod by means of a mobile gas burner which moves at a speed of 20 cm/min along the rod in the longitudinal direction between the clamping chucks of the glass turning lathe. To accomplish this, a gas flow of approximately 70 Nml/min of $SiCl_4$ which reacts in the flame to form $SiO_2$ is added to the fuel gas mixture and leads to the formation of a porous powdery layer on the circumference of the rod. A second burner is conducted along a path which extends along the rod and is offset to the first burner and the second burner produces a limited heating zone on the rod. The heating zone travels through the longitudinal region between the chucks and has a temperature of approximately of 1900°–2000° K. In the advancing heating zone, the deposited powder is melted until it becomes clear and forms a glass layer having a thickness of approximately 5 μm. At the end of one cycle of travel of the burner through the longitudinal region, the burner is returned to the starting position at the other end of the longitudinal region without depositing powder and melting this formed glass layer. Now the direction of rotation of the rod is changed. When the rod has reached the rotary position which is rotated relative to the start point which it occupied at the beginning of the preceding burner cycle, the burners recommence operation. When an adequate layer thickness has been reached, a $BCl_3$ gas flow of approximately 50 Nml/min is added to the flow of $SiCl_4$ to start forming the layers of cladding glass. The deposited glass layer now contains the $B_2O_3$ and has a lower index of refraction than the pure $SiO_2$ layers. In order to avoid the need to remove the substrate rod at the end of the coating process, it is expedient to use a rod which is produced by the described process and which has been multiply stretched and consequently contains only a thin core of commercially available quartz glass.

The above described process is particularly suitable for producing glass rods for forming glass fibers of low birefringence.

EXAMPLE III

Cylindrical bodies may also be produced by depositing the glass out of a gas phase onto a flat rotating surface such as a flat rotating dish or plate. This process is suitable for the production of glass rods of arbitrary length. For this purpose, a cylindrical quartz glass plate or dish is clamped in the chuck of a turning lathe. For example, the quartz glass plate may have its center fused to a quartz glass rod, which will extend from a center of a rear surface of the plate and thus, the quartz glass rod is received in the chuck so that the plate and rod rotate about the rod axis. A gas flame in which $SiCl_4$ has been added is directed against the flat front surface of the plate to deposit a porous powder deposition of $SiO_2$ on the surface. A mobile slide is used to conduct the burner at right angles to the plate axis over the surface of the plate. In order to achieve a uniform coating, the period of dwell of the burner in the center of the plate is kept shorter than that at the edge of the plate. When the burner has reached the oppsite edge of the plate, the $SiCl_4$ supply is erupted and the direction of travel is reversed. During the reversed movement of the burner the temperature of the burner is increased so as to produce a local heating zone on the surface of the plate which zone travels over the entire diameter of the plate and in which this $SiO_2$ layer is melted until it becomes clear and forms a glass layer.

When the starting position is reached, the burner commences a new depositing and melting cycle after the direction of rotation of the plate has been modified and the plate has reached the position which is rotated relative to the starting position which it occupied at the start of the preceding cycle. If an $SiCl_4$ gas quantity of 400 Nml/min is fed into the burner, a growth in the layer thickness of approximately 0.4 cm/h is obtained on a plate having a diameter of 6 cm. From the cylinder or rod formed in this way, it is then possible, to draw glass fibers in a known manner and the glass fibers are characterized by a particularly small birefringence.

The method is schematically illustrated as an improvement in a method for producing a glass coating on a body such as a glass coating 1 on an interior wall of a tubular body 2 by introducing a substance containing a glass forming material in a direction of arrow 3 and applying it on the interior wall of the tube 2. The glass forming material is then transformed into a glass layer by heating a localized zone with a heating means such as a burner 4 which is moved along the body in a direction of the an arrow 5 from starting point A at one end 8 of the tube to the other end 9 of the tube as the tube is rotated in a direction indicated by the arrow 6. The improvement is that after completing one cycle by returning the burner in the direction 10 to the starting point, the tube is either rotated in the opposite direction indicated by an arrow 7 during the next passage of the burner 4 from a starting point A in the direction 5 or while continuing to rotate the tube in the direction 6, the starting point is shifted or rotated to another position such as the position B, which may be 180° from the initial starting position A. After completing the second cycle, the burner 4 is again brought back to the starting position A for the next succeeding cycle. It is also possible that both the position of the starting is rotated or changed and the direction of rotating is changed for each following cycle.

Although various minor modifications may be suggested by those versed in the art, it should be understood that we wish to embody within the scope of the patent granted hereon, all such modifications as reasonably and properly come within the scope of our contribution to the art.

We claim:

1. In a process for producing a coated glass body and particularly a coated glass body for use in the production of glass fiber for a light waveguide, said process including rotating a body, and forming a plurality of glass layers on a surface of the rotating body with each glass layer being formed by a cycle including applying at least one substance containing a glass forming material on a surface of the rotating body, and then transforming the glass forming material into a glass layer by heating a local zone of the surface of the body and moving the zone in a predetermined direction along the surfaces of the body, the improvement comprising selectively changing a selected one of the direction of rotation of the body relative to the direction of moving of the heating zone along the surface of the body and the point of starting the step of heating as the heating zone is moved along the surface of the body during each cycle from the point of starting the previous cycle so that the effect of anisotropy of the combined layers of glass is largely eliminated.

2. In a process according to claim 1, wherein the step of changing comprises changing the direction of rotation after each cycle is terminated and before commencement of the next cycle.

3. In a process according to claim 1, wherein the step of changing comprises changing the direction of rotation prior to commencing each cycle and changing the point of starting each cycle to a different rotary position from the point of starting the preceding cycle.

4. In a process according to claim 3, wherein the step of changing the point of starting the cycle to a different rotary position comprises rotating the point of starting through 180°.

5. In a process according to claim 1, wherein the direction of rotation of the body is maintained relative to the direction of travel of the heating zone, and said step of changing changes the point of starting the travel of the heating zone for each cycle between a pair of rotary positions which are rotated 180° from each other.

* * * * *